(12) United States Patent
Sekine et al.

(10) Patent No.: US 6,429,906 B1
(45) Date of Patent: Aug. 6, 2002

(54) PROJECTION DISPLAYS WITH DIVERGENT CHIEF RAYS AT BEAM SPLITTER

(75) Inventors: Atsushi Sekine, Kusakabe; Tetsuo Hattori, Yokohama, both of (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 09/594,327

(22) Filed: Jun. 14, 2000

Related U.S. Application Data

(63) Continuation of application No. 08/909,307, filed on Aug. 11, 1997, now abandoned.

(30) Foreign Application Priority Data

| Aug. 12, 1996 | (JP) | ................................. 8-229270 |
| Aug. 12, 1996 | (JP) | ................................. 8-229272 |
| Oct. 30, 1996 | (JP) | ................................. 8-288547 |
| Mar. 28, 1997 | (JP) | ................................. 9-095304 |

(51) Int. Cl.$^7$ ........................... G02F 1/335; G03B 21/28
(52) U.S. Cl. ............................................. 349/9; 353/34
(58) Field of Search ................ 349/5, 6, 7, 8, 349/9; 353/34, 81, 31

(56) References Cited

U.S. PATENT DOCUMENTS

| 4,191,456 | A |   | 3/1980 | Hong |
| 5,097,323 | A |   | 3/1992 | Sato et al. |
| 5,221,982 | A | * | 6/1993 | Faris ............................. 353/31 |
| 5,357,289 | A | * | 10/1994 | Konno et al. ................. 348/757 |
| 5,365,287 | A | * | 11/1994 | Vollmer et al. ............... 353/31 |
| 5,374,968 | A | * | 12/1994 | Haven et al. ................. 353/31 |
| 5,418,583 | A |   | 5/1995 | Matsumoto |
| 5,420,655 | A |   | 5/1995 | Shimizu |
| 5,438,379 | A |   | 8/1995 | Kurematsu |
| 5,543,870 | A | * | 8/1996 | Blanchard ..................... 353/74 |
| 5,634,704 | A |   | 6/1997 | Shikama et al. |
| 5,772,299 | A |   | 6/1998 | Koo et al. |
| 5,795,047 | A | * | 8/1998 | Sannohe et al. .............. 353/81 |
| 5,798,819 | A |   | 8/1998 | Hattori et al. |
| 5,800,033 | A |   | 9/1998 | Funanami et al. |
| 5,808,795 | A | * | 9/1998 | Shimomura et al. ......... 359/488 |
| 5,867,320 | A | * | 2/1999 | Park et al. .................... 362/32 |

FOREIGN PATENT DOCUMENTS

| JP |   | 63-39294 | 2/1988 |
| JP |   | 3-236696 | 10/1991 |
| JP |   | 8-234156 | 9/1996 |

* cited by examiner

Primary Examiner—Kenneth Parker
(74) Attorney, Agent, or Firm—Klarquist Sparkman, LLP

(57) ABSTRACT

Projection displays are disclosed that reduce the loss of image contrast due to angle-of-incidence and color dependencies of liquid crystal display panels, polarizing beamsplitters, and dichroic reflectors. The projection displays comprise an illumination source that provides a light flux that made uniform by an integrator. A color separation system then divides the light flux into red, green, and blue color components. The color-components are directed through field lenses to polarizing beamsplitters and then to liquid crystal light valves. The color components are reflected by the light valves back through the polarizing beamsplitters to a projection lens that forms an image. The projection lens is preferably telecentric. Field lenses are provided that direct substantially collimated color components to the liquid crystal light valves.

27 Claims, 11 Drawing Sheets

PROJECTION DISPLAYS WITH DIVERGENT CHIEF RAYS AT BEAM SPLITTER

This application is a continuation of Ser. No. 08/909,307 filed Aug. 11, 1997 now abandoned.

FIELD OF THE INVENTION

The invention pertains to a projection display that projects an image produced by liquid-crystal light valves.

BACKGROUND OF THE INVENTION

Conventional full-color projection displays using reflective light valves, such as that of Unexamined Japanese Patent Document 63-39294 are known. FIG. 13 shows an arrangement of such a conventional projection display. A white illumination-light flux is emitted from a light source 223 that comprises, for example, a halogen lamp. The illumination-light flux typically passes through a collimating lens 222 operable to make parallel the rays comprising the illumination-light flux. The illumination-light flux then enters a polarizing beamsplitter (PBS) 221 disposed along the optical axis O of a color-separation optical system 211.

S-polarized light of the illumination-light flux is reflected by the PBS 221 and is incident on the color-separation optical system 211. The s-polarized illumination-light flux incident on the color-separation optical system 211 is separated into the three primary colors, red (R), blue (B), and green (G), as follows.

The color separation optical system 211 includes a first prism 211A, a second prism 211B, and a third prism 211C, each disposed as shown in FIG. 13. A surface 211e of the first prism 211A is coated with a dichroic film that reflects blue light but transmits light with longer wavelengths (i.e., red and green light). There is a gap between the first prism 211A and the second prism 211B. A dichroic film that reflects red light but transmits green light is coated on a surface 211f of the second prism 211B, between the second prism 211B and the third prism 211C.

As the illumination-light flux reflected from the PBS 221 enters through an incidence surface 211a of the first prism 211A, blue light is reflected by the surface 211e and is then reflected inwardly by the surface 211a toward an emergence surface 211b of the first prism 211A. Red light that passes through the surface 211e of the first prism 211A is reflected by the surface 211f and is then reflected inwardly by the surface of the second prism 211B between the first and the second prisms. The inwardly reflected red light then exits through an emergence surface 211c of the second prism 211B. Green light that passes through the surface 211e of the first prism 211A and through the surface 211f of the second prism 211B travels toward an emergence surface 211d of the third prism 211C.

Reference numerals 212, 213, and 214 denote two-dimensional reflection-type liquid crystal light valves (LCLVs) for displaying a blue light image, a red light image, and a green light image, respectively. Each of the reflective-type LCLVs has a dielectric reflecting layer 215, 216, and 217, respectively, formed on the back of a respective transmission-type LCLV so that the LCLVs 215, 216, 217 operate as reflection-type LCLVs. As each color of light enters a respective LCLV, the light is modulated by the respective LCLV. Hence, each color's video signal is converted into an image that has a transmission-rate distribution at the respective LCLV.

The modulated color light is then reflected and changed in polarization state by 90°. That is, the s-polarized light is converted by the LCLV to p-polarized light. The modulated and reflected color lights travel along reverse paths through the first, second, and third prisms 211A, 211B, 211C, respectively, to be combined into a single light flux. The resultant combined, single light flux emerges from the incidence surface 211a of the first prism 211A. The light flux whose polarization state has been converted is transmitted through the PBS 221 and projected on a screen 225 by a projection lens 224.

A problem with the conventional example shown in FIG. 13 is its inability to provide sufficiently high-contrast projected images. The conventional projection display described herein does not project an ideal "black" image on the screen for the following reasons.

As linearly polarized light fluxes are incident on the dichroic films, after being passed through the PBS 221, the light flux is in part transmitted and in part reflected by the dichroic films. A light flux incident on a dichroic film and having a plane of polarization that is not entirely s-polarized or p-polarized with respect to the dichroic film is separated into s-polarized light and p-polarized light by the dichroic film. In addition, reflection and transmission by the dichroic film impose a phase difference between the s-polarized light and p-polarized light. As a result, the light flux exiting the dichroic film is typically elliptically polarized. Hence, the light flux transmitted by the PBS 221 includes light of undesirable polarization. The PBS 221 then directs the undesirable polarized light toward the screen 225. Accordingly, an ideal black image is not projected on the screen 225 and image contrast is degraded.

The light flux from the light source 223 is split into polarized components by the polarizing beamsplitter 221, and one of the polarized components is subsequently color-separated and color-combined by the prisms 211A, 211B, 211C. The polarizing beamsplitter 221 analyzes the color-combined light flux that is directed to the screen 225. A rotation of the plane of polarization of the light flux at the prisms 211A, 211B, 211C results in a degradation of image contrast as well. In order to prevent such a rotation of the plane of polarization, it is necessary to make the prisms 211A, 211B, 211C from a material having an extremely low birefringence, increasing material and fabrication costs. Even when low-birefringence materials are used, birefringence is not completely eliminated, and image contrast is degraded.

The invention provides projection displays that reduce image contrast deterioration caused by polarization changes in color-separation and color-combining optical systems. Furthermore, the invention provides projection displays that do not exhibit image-contrast degradation caused by birefringence in the color-separation and color-combining optical systems.

SUMMARY OF THE INVENTION

Projection displays according to the invention preferably comprise a color-separation optical system having a plurality of substantially parallel dichroic mirrors. The color-separation system separates a light flux from a light source into multiple (e.g., first, second, and third) color components. Alternatively, the dichroic mirrors of the color-separation system are arranged to form a crossed dichroic-mirror or prism.

A separate light valve is provided for individually modulating each corresponding color component. Multiple (e.g., first, second, and third) polarizing beamsplitters are provided to polarize the color components before the color components are incident to corresponding light valves; the polarizing beamsplitters further serve to analyze the color components after modulation and reflection by the light valves. Because each polarizing beamsplitter is used with a single color component, the polarizing beamsplitters can have performance superior to that of a polarizing beamsplitter to be used with multiple color components.

A color-combining optical system is provided to re-combine the color components after the color components are modulated and analyzed. The color-combining optical system preferably comprises an L-shaped dichroic prism having a plurality of substantially parallel dichroic reflecting surfaces. Alternatively, a plurality of substantially parallel dichroic mirrors can be provided or a plurality of substantially parallel dichroic films. Similarly, crossed-dichroic mirrors can be used instead of a crossed-dichroic prism. Because the color-combining system receives the color components after analysis by the polarizing beamsplitters, birefringence and other polarization effects in the color-combining system have little effect on image contrast. Expensive, low-birefringence materials and mountings are unnecessary.

A projection optical system receives the combined, modulated, and analyzed color components from the color-combining optical system and forms an image.

Each color component preferably passes through a corresponding field lens placed between the color-separation optical system and the corresponding light valve. Such field lenses collimate respective color components before reaching the light valves, thereby reducing the range of angles of incidence of the color components on the light valves. The field lenses preferably cause the chief rays of the projection lens, i.e. rays that pass through the center of the aperture stop of the projection lens, to propagate parallel to an optical axis when incident on the polarizing beamsplitters, the color-combining system, and the light valves. The field lenses direct the color components so that chief rays incident on the light valves are parallel throughout the modulation regions of the light valves. This arrangement reduces contrast variation and color shading caused by angle-of-incidence variations in the modulation of the light valves. Such an arrangement also reduces image-contrast degradation due to angle-of-incidence dependencies in the polarizing beamsplitters and the color-combining system. In particular, color shading in a projected image due to angle-of-incidence variations of the color-combining system is reduced.

The projection displays preferably comprise a telecentric projection lens. In a telecentric lens, a chief ray (i.e., a ray passing through the center of the aperture stop) propagates parallel to an axis after passing though the lens.

Optical path lengths from the illumination system to the light valves are preferably equal for all color components. Similarly, optical path lengths from the light valves to the projection lens are preferably equal. Alternatively, optical path lengths for two of the color components are equal and a relay optical system compensates for the differing optical path of the third.

The illumination system preferably directs a light flux to an integrator such as a rod integrator. A relay lens and a field lens are preferably provided that image an exit surface of the integrator onto the light valves. In conjunction with the telecentric projection lens and field lenses associated with each light valve, telecentric critical illumination is achieved.

The foregoing and other objects, features, and advantages of the invention will become more apparent from the following detailed description of Example Embodiments which proceeds with reference to the accompanying drawings.

DETAILED DESCRIPTION

For convenience in describing the example embodiments, directions toward an illumination system are referred to as "illumination-wise"; directions toward an image are referred to as "image-wise". As is well-known, an optical axis of an optical system containing mirror and prisms typically is redirected by such mirrors and prisms. In describing the example embodiments, "optical axis" refers to an axis as redirected by mirror and prisms of the optical system.

EXAMPLE EMBODIMENT 1

Figure 1:
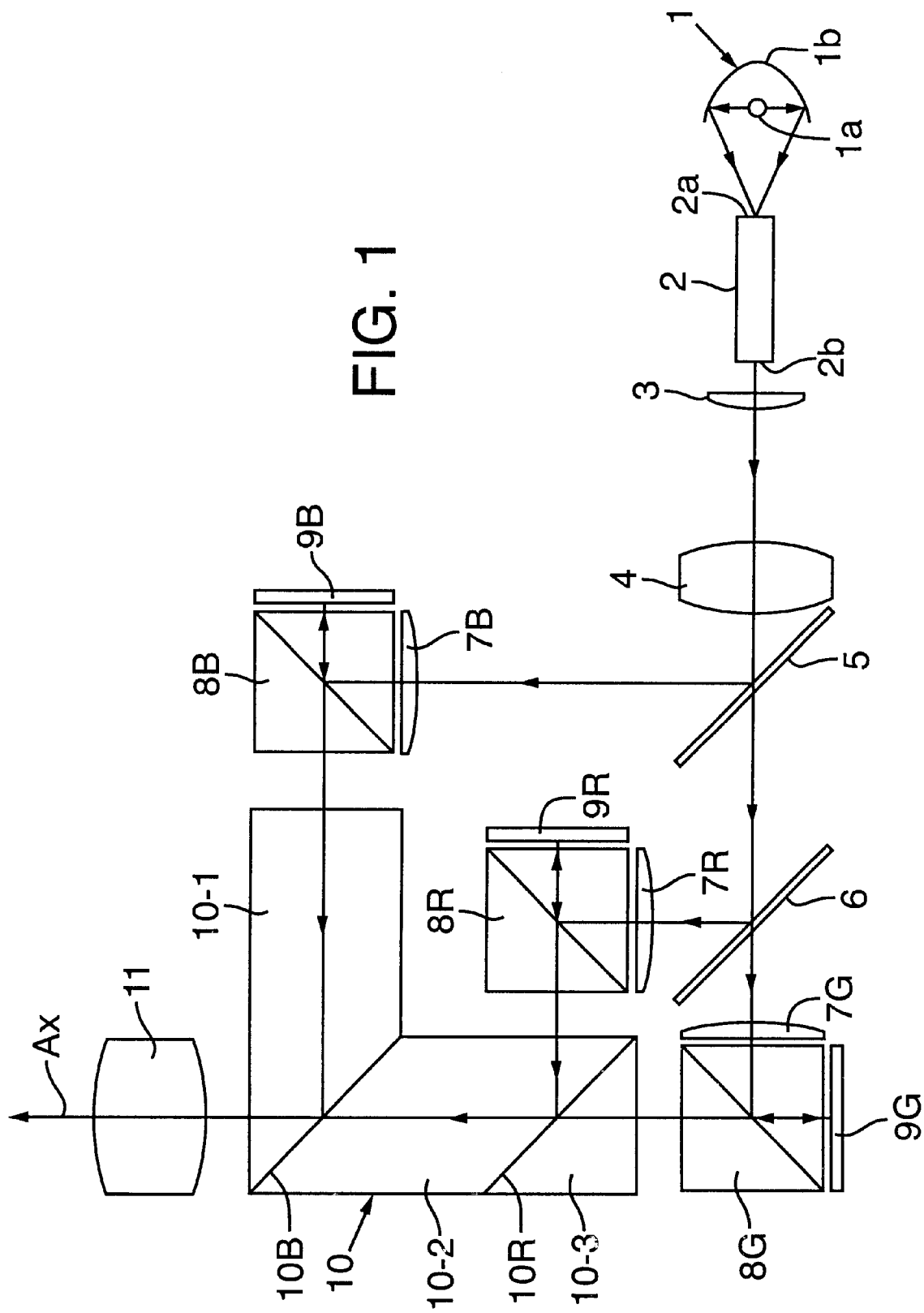
FIG. 1 is a schematic diagram of a projection display according to Example Embodiment 1.

With reference to FIG. 1, a projection display according to Example Embodiment 1 comprises an illumination system 1 having a light source 1a and an ellipsoidal mirror 1b. The illumination system 1 emits a light flux having a red (R) component, a (B) blue component, and a green (G) component. For convenience, these components will henceforth be referred to as the R-component, the B-component, and the G-component, respectively. The light source 1a is placed near a first focus of the ellipsoidal mirror 1b. The light flux from the light source 1a is directed by the ellipsoidal mirror 1b to a second focus. An entrance face 2a of a rod integrator 2 receives the light flux from the ellipsoidal mirror 1b. The rod integrator 2 comprises a series of transparent optical glass plates that form a rectangular parallelopiped having a rectangular cross-section. The entrance face 2a of the rod integrator 2 is placed at a second focus of the ellipsoidal mirror 1b. A light flux incident upon the rod integrator 2 becomes more uniform because of multiple reflections within the rod integrator 2 and then exits an exit face 2b of the rod integrator 2.

The light flux exiting the exit face 2b of the rod integrator 2 is then transmitted by a first field lens 3. The field lens 3 directs the light flux to a relay lens 4. The light flux is then incident at 45° to a blue-component reflecting dichroic mirror (B-mirror) 5. The B-component of the light flux incident upon the B-mirror 5 is reflected to a second field lens 7B and then to a B-component polarizing beamsplitter (B-PBS) 8B. The B-mirror 5 does not reflect the R-component or the G-component of the light flux. The R-component and the G-component are incident at an angle of 45° to an R-component reflecting dichroic mirror (R-mirror) 6 that is substantially parallel to the B-mirror 5. The R-component is reflected by the R-mirror 6 and propagates to a third field lens 7R and an R-component polarizing beamsplitter (R-PBS) 8R. The G-component of the light flux is transmitted by the R-mirror 6 to a fourth field lens 7G and a G-component polarizing beamsplitter (G-PBS) 8G. The light flux from the light source 1 is thereby separated into R-, G-, and B-components by the B-mirror 5 and the R-mirror 6; the B-mirror 5 and the R-mirror 6 thus form a color-separation system.

The B-, R-, and G-components are incident on the B-PBS 8B, the R-PBS 8R, and the G-PBS 8G, respectively. Each color component is split into a p-polarization that is transmitted and an s-polarization that is reflected. The p-polarizations are discarded and the reflected s-polarizations are directed to reflective light valves 9B, 9R, 9G, respectively. The light valves 9B, 9R, 9G are arranged near exit faces of the PBSs 8B, 8R, and 8G.

Figure 12:
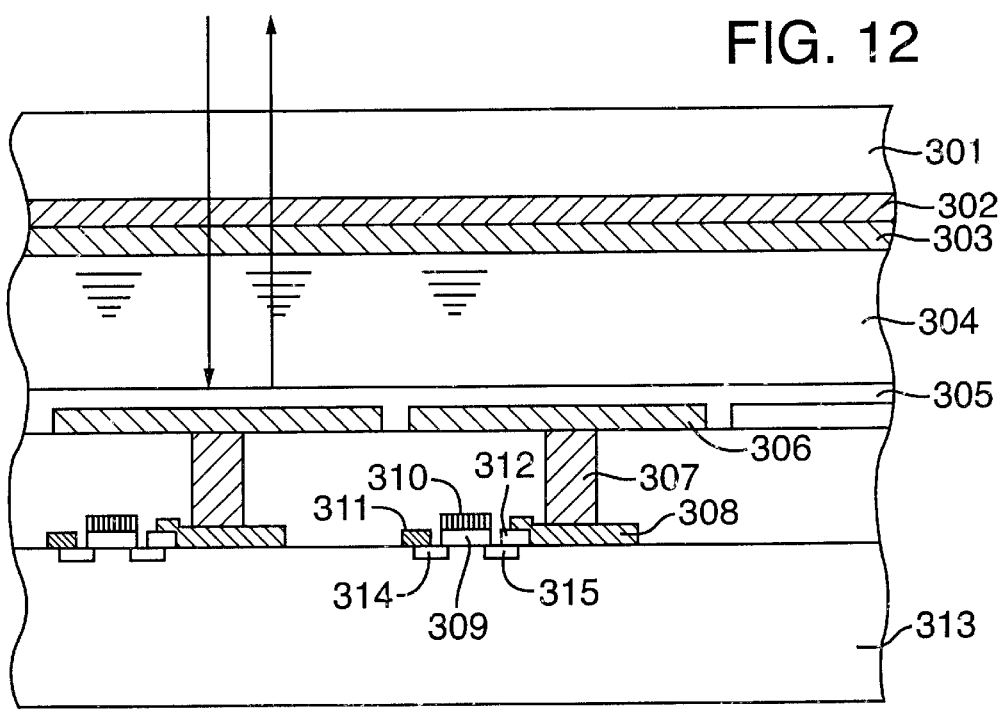
FIG. 12 is sectional view of an example electrically addressable reflective light valve.
Figure 13:
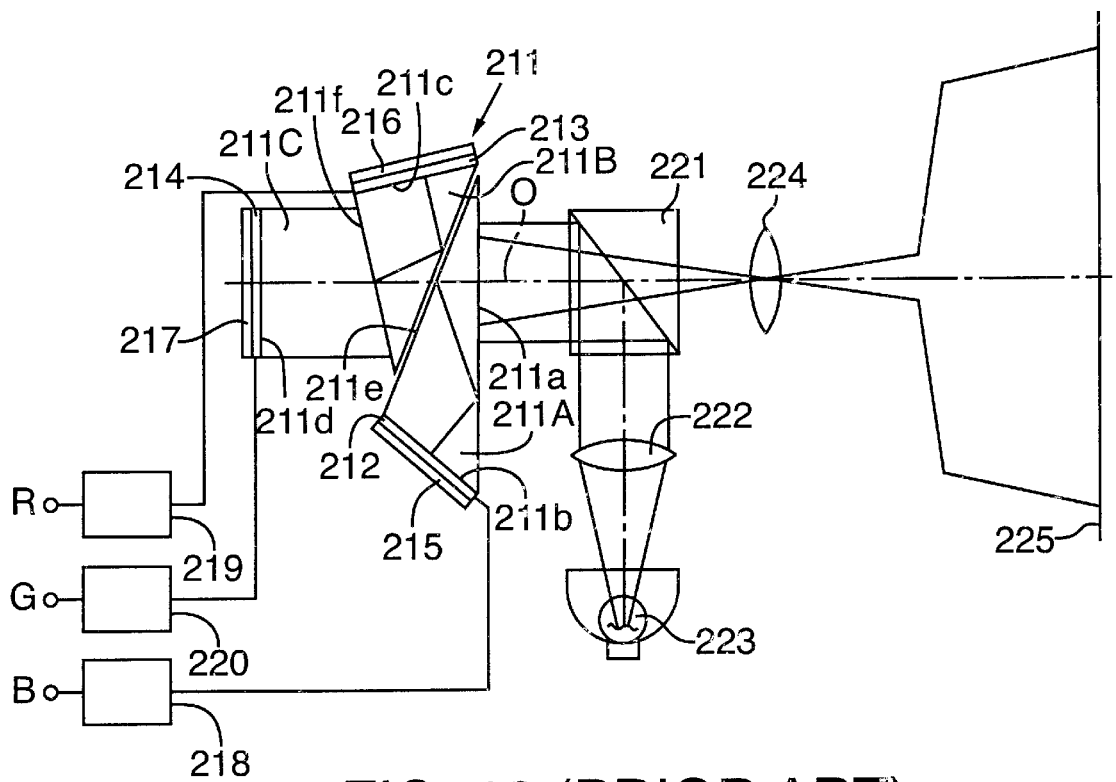
FIG. 13 is a schematic diagram showing a conventional projection display.

With reference to FIG. 12, each of the reflective light valves 9R, 9G, and 9B comprises a transparent glass substrate 301 coated with a transparent indium-tin oxide (ITO) electrode 302 and a liquid crystal alignment layer 303. Each of the reflective light valves further comprises a silicon substrate 313 having thin-film transistors (TFTs) corresponding to the picture elements. A representative TFT comprises a drain 312, a gate 310, a source 311, and an oxide layer 309. The representative TFT has a source diffusion region 314 and a TFT drain diffusion region 315. Conductors 307, 308 electrically connect the TFT drain 312 to a reflective electrode 306. A liquid crystal alignment layer 305 covers the reflective electrode 306 and a twisted-nematic (TN) liquid crystal layer 304 is formed between the alignment layers 303, 305.

Operation of the reflective light valves 9R, 9G, 9B is generally as follows. An addressing voltage is applied by an electrical image source to the gate 310, switching the TFT so the drain 312 produces a voltage between the reflective electrode 306 and the ITO electrode 302. The applied voltage causes the liquid crystal molecules in the region between the reflective electrode 306 and the ITO electrode 302 assume an alignment such that liquid crystal layer 304 acts as a quarter-wave phase plate. A linearly polarized light flux incident to this region becomes circularly polarized before reflection by the reflective electrode 306. After reflection, the light flux returns through the liquid crystal layer 304. The state of polarization of the light flux is converted from a circular to a linear polarization oriented at 90° with respect to the linear polarization of the incident light flux. The light flux then exits the reflective light valve.

If the TFT is not switched by an addressing voltage, no voltage is applied to the reflective electrode 306 by the gate 310. In this case, there is no electric field applied between the reflective electrode 306 and the ITO electrode 302; the liquid crystal molecules remain in an alignment determined by the liquid crystal alignment layers 303, 305. A plane of polarization of an incident light flux rotates in accordance with the alignment of the liquid crystal molecules until the incident light flux is reflected by the reflective electrode 306. After reflection, the plane of polarization of the light flux again rotates in accordance with the alignment of the liquid crystal molecules. The light flux thus enters and exits the reflective light valve with the same plane of polarization. For the TN liquid crystal layer 304, the plane of polarization of the incident light flux follows a twist in the alignment direction of the liquid crystal molecules.

Thus the plane of polarization of an incident light flux is selectively rotated by 90° in regions in which a TFT is switched to apply a voltage between the reflective electrode 306 and the ITO electrode 302. Because the TFT is beneath the reflective electrode 306, the reflective electrode 306 can have a large area and an intense light flux can be used.

While Example Embodiment 1 uses reflective light valves 9R, 9G, 9B that are electrically addressable, it will be readily apparent that other addressing means such as optical addressing are suitable. In addition, the projection displays of the invention are applicable to other types of light valves.

The s-polarized R-, G-, and B-components are modulated by the light valves 9R, 9G, 9B, respectively, by signals corresponding to the image to be displayed. The R-, G-, and B-components exit the respective light valves 9R, 9G, and 9B with image modulation and return to the polarizing beamsplitters 8R, 8G, and 8B, respectively. It will be appreciated that the modulated color components are p-polarized from locations at which a voltage was applied and s-polarized from locations at which a voltage was not applied to the respective light valves.

The modulated color components are incident upon and analyzed by the PBSs 8R, 8G, 8B; only the p-polarized components of the modulated color components are transmitted through the respective PBS. The p-components propagate to a dichroic prism 10 that combines the color components while the s-polarized components are directed away from the dichroic prism 10 by the PBSs 8R, 8G, 8B.

A color-combining system comprises the dichroic prism 10 (FIG. 1). The dichroic prism 10 has prisms 10-1, 10-2, 10-3. A B-component reflecting layer 10B is provided between the prisms 10-1, 10-2 and an R-component reflecting layer 10R is provided between the prisms 10-2, 10-3. The layers 10B, 10R are parallel to each other and are oriented at 45° with respect to an optical axis Ax so that the dichroic prism 10 is L-shaped.

The modulated B-component exits PBS 8B and is incident on the prism 10-1. The B-reflecting layer 10B then reflects the B-component through the prism 10-1 and to the projection lens 11. The modulated R-component exits the PBS 8R and is incident on the prism 10-2. The R-reflecting layer 10R reflects the R-component through the prism 10-2, the B-reflecting layer 10B, and a portion of the prism 10-1. The R-component then exits the dichroic prism 10 and propagates to the projection lens 11. The modulated G-component exits PBS 8G and is transmitted by the R-reflecting layer 10R and the B-reflecting layer 10B. The R-component then propagates through the prism 10-1 to the projection lens 11. After exiting the dichroic prism 10, it is preferable that the color-components propagate along a common optical axis, as indicated by the axis Ax.

The dichroic prism 10 thus re-combines the modulated color components. The re-combined color components exit the dichroic prism 10; the projection lens 11 projects the re-combined, modulated color components, forming an image on a projection screen (not shown in FIG. 1).

In Example Embodiment 1, the optical path lengths of the color components from the exit face 2b of the rod integrator 2 to the light valves 9R, 9G, 9B, respectively, are equal to each other. Similarly, the optical path lengths of the optical paths of the color components from the light valves 9R, 9G, 9B to the projection lens 11 are equal to each other.

Figure 2:
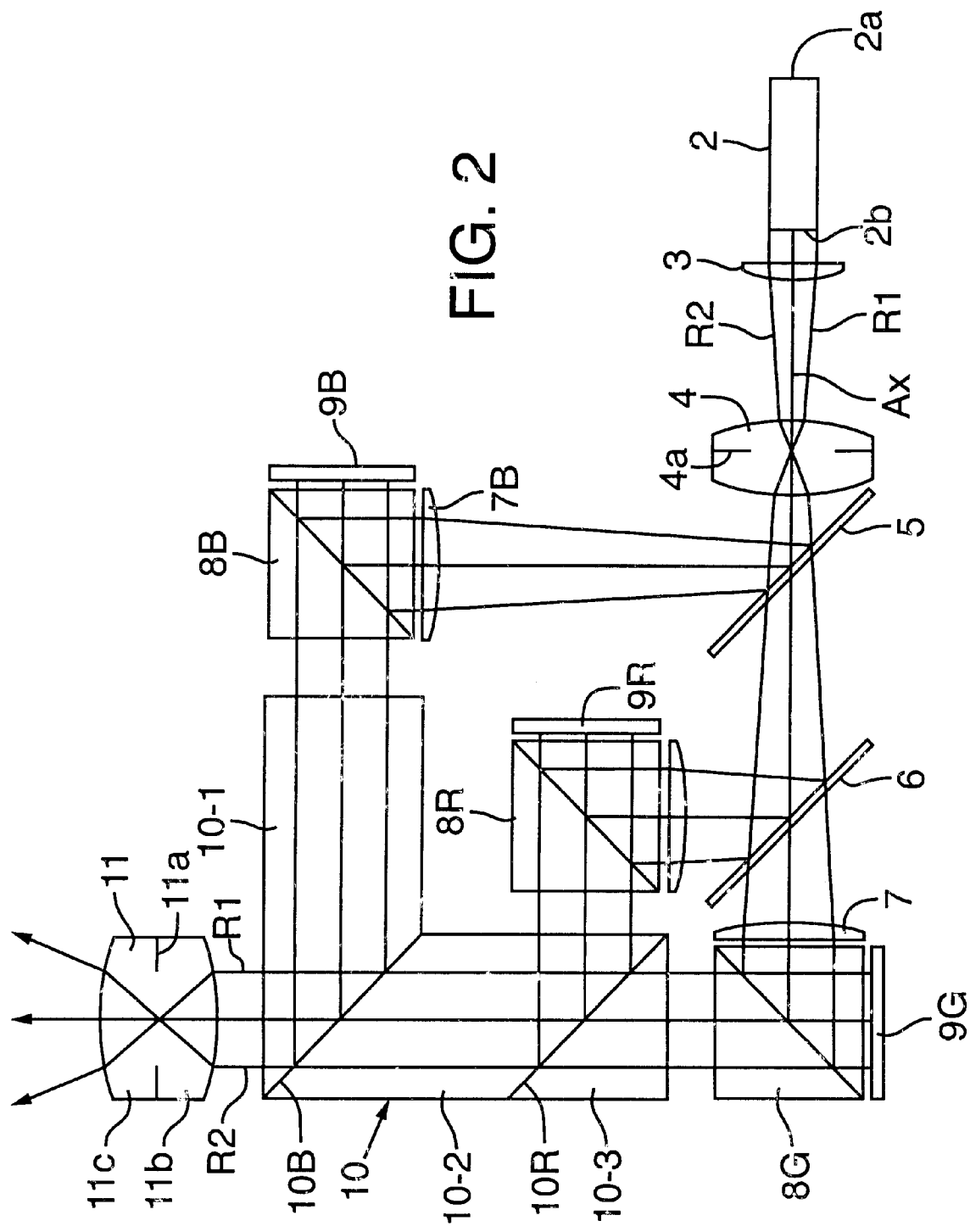
FIG. 2 is an optical diagram showing optical ray paths in the projection display of FIG. 1.

As shown in FIG. 2, the projection lens 11 comprises an aperture stop 11a, an illumination-side lens group 11b, and an image-side lens group 11c. The aperture stop 11a is placed at the back focus (i.e., the image-side focal point) of the lens group 11b. Exemplary rays R1, R2 that propagate parallel to the axis Ax from the color-combining system to the projection lens 11 pass through the center of the aperture stop 11a. As will be readily apparent, rays R1, R2 are therefore "chief rays" of the projection lens 11.

The relay lens 4 also has an aperture stop 4a; the rays R1, R2 pass through the center of the aperture stop 4a and are therefore chief rays of the relay lens 4.

The light valves 8R, 8G, 8B are illuminated as follows. The light flux incident to the rod integrator 2 exits the exit face 2b and is then incident to a relay optical system consisting of the field lens 3, the relay lens 4, and field lenses 7B, 7R, 7G. Dichroic mirrors 5, 6 form the color-separation optical system and are placed between the relay lens 4 and the field lenses 7B, 7R, 7G. For each color component, the relay lens 4 forms a magnified, real image of the exit face 2b of the rod integrator 2 on the light valves 9R, 9G, and 9B. In addition, the field lenses 7B, 7R, 7G cause the chief rays, such as exemplary rays R1, R2, to be parallel to the optical axis Ax as the rays R1, R2 are incident to the PBSs 8B, 8R, 8G and light valves 9B, 9R, 9G, respectively. Thus, telecentric critical illumination of the light valves 9B, 9R, 9G is achieved for each of the color components. In addition, the chief rays such as exemplary rays R1, R2 propagate parallel to the axis Ax while passing through the color-combining system and the PBSs 8R, 8B, 8G toward the projection lens 11.

The reflecting layers 10R and 10B used for re-combining the separated R-, G-, and B-components are preferably multilayer dielectric coatings. The reflectance of such coatings depends upon the angle of incidence of a light flux. Therefore, off-axis chief rays incident upon the layers 10R, 10B at differing angles of incidence produce color shading in the projected image on the screen. Because chief rays propagate parallel to the axis Ax through the dichroic prism 10 that recombines the color components, the projection display of Example Embodiment 1 exhibits no such color shading.

Similarly, the polarizing beamsplitters 8R, 8G, 8B also have different polarizing and beamsplitting properties for differing angles of incidence. Such differences in polarizing and beamsplitting properties cause contrast non-uniformities in the projected image. Because chief rays propagate parallel to the axis Ax through the PBSs 8R, 8B, 8G, there are no such contrast non-uniformities.

Variation in off-axis chief-ray angle of incidence at the liquid crystal light valves 9R, 9G, 9B also causes modulation variations in the crystal layer 304, causing contrast non-uniformities in the projected image. The telecentric system of Example Embodiment 1 also avoids these non-uniformities.

In addition, each of the polarizing beamsplitters 8R, 8G, 8B polarizes and analyzes only a single respective color-component. Therefore, the polarizing beamsplitters 8R, 8G, 8B can have improved polarizing properties.

In addition, the color-components reflected by the light valves 9R, 9G, 9B are analyzed by the polarizing beamsplitters 8R, 8G, 8B, respectively, before the color-components are incident on the dichroic prism 10 that re-combines the color-components. Even if there is some birefringence in the prisms 10-1, 10-2, 10-3, this birefringence will not degrade the projected image because the color-components have already been analyzed. Therefore, expensive, low-birefringence materials are not needed for the manufacture of the dichroic prism 10.

EXAMPLE EMBODIMENT 2

Figure 3:
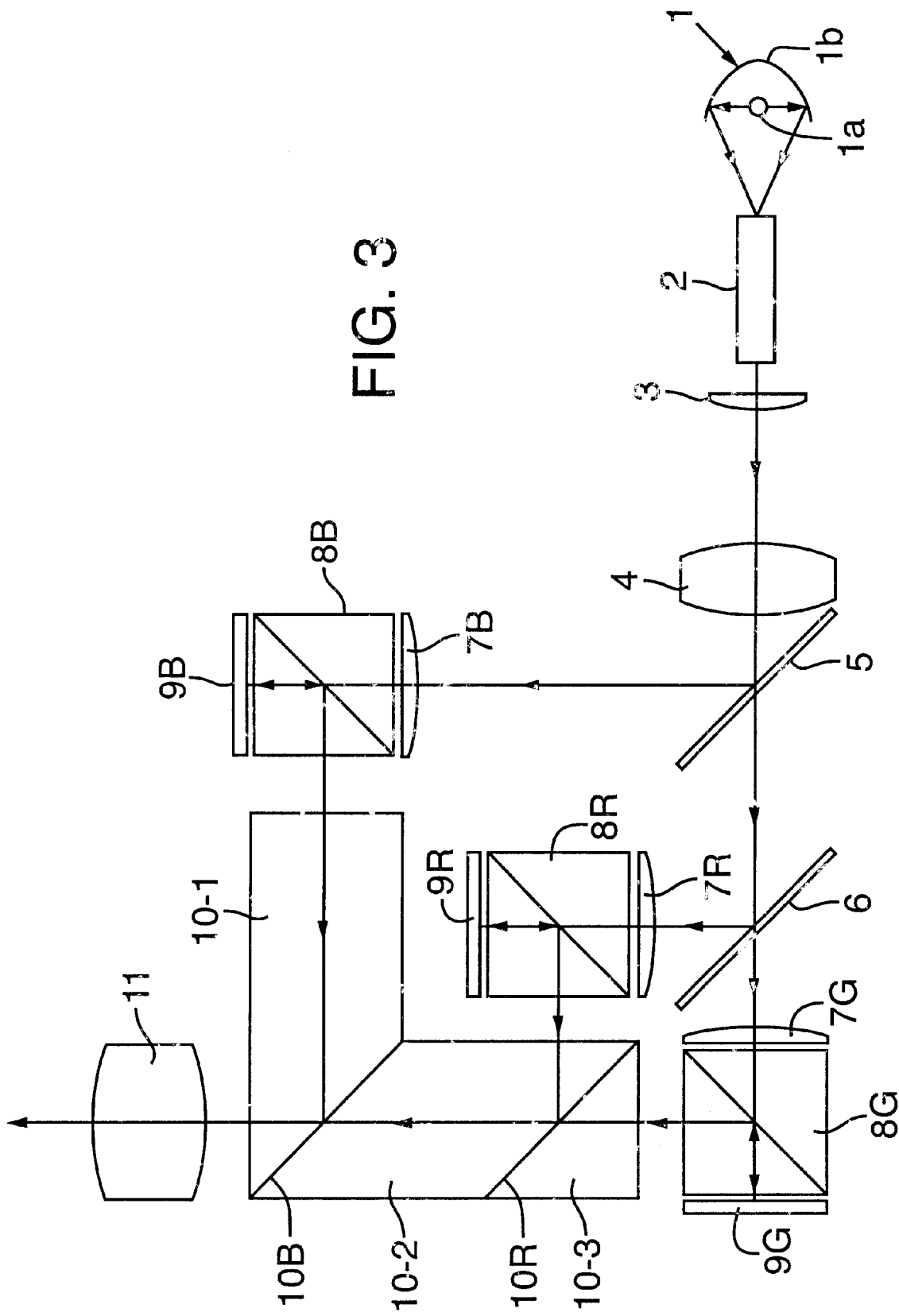
FIG. 3 is a schematic diagram of a projection display according to Example Embodiment 2.

Example Embodiment 2 is described with reference to FIG. 3. For convenience, FIG. 3 uses reference designators that are the same those used for corresponding elements of Example Embodiment 1, as described with reference to FIG. 1; additional description of these elements is omitted.

A projection system according to Example Embodiment 2 differs from that of Example Embodiment 1 as follows. First, whereas the projection system of Example Embodiment 1 directs s-polarized light to the light valves 9R, 9G, 9B, the projection system of Example Embodiment 2 performs color separation and then directs p-polarized color components to the light valves 9R, 9G, 9B. The light valves 9R, 9G, 9B are arranged so that the color components incident on the polarizing beamsplitters 8R, 8G, 8B are transmitted to the light valves 9R, 9G, 9B; after modulation and reflection by the light valves 9R, 9G, 9B the modulated color-components returning to the polarizing beamsplitters 8R, 8G, 8B are reflected to the dichroic prism 10.

EXAMPLE EMBODIMENT 3

Figure 4:
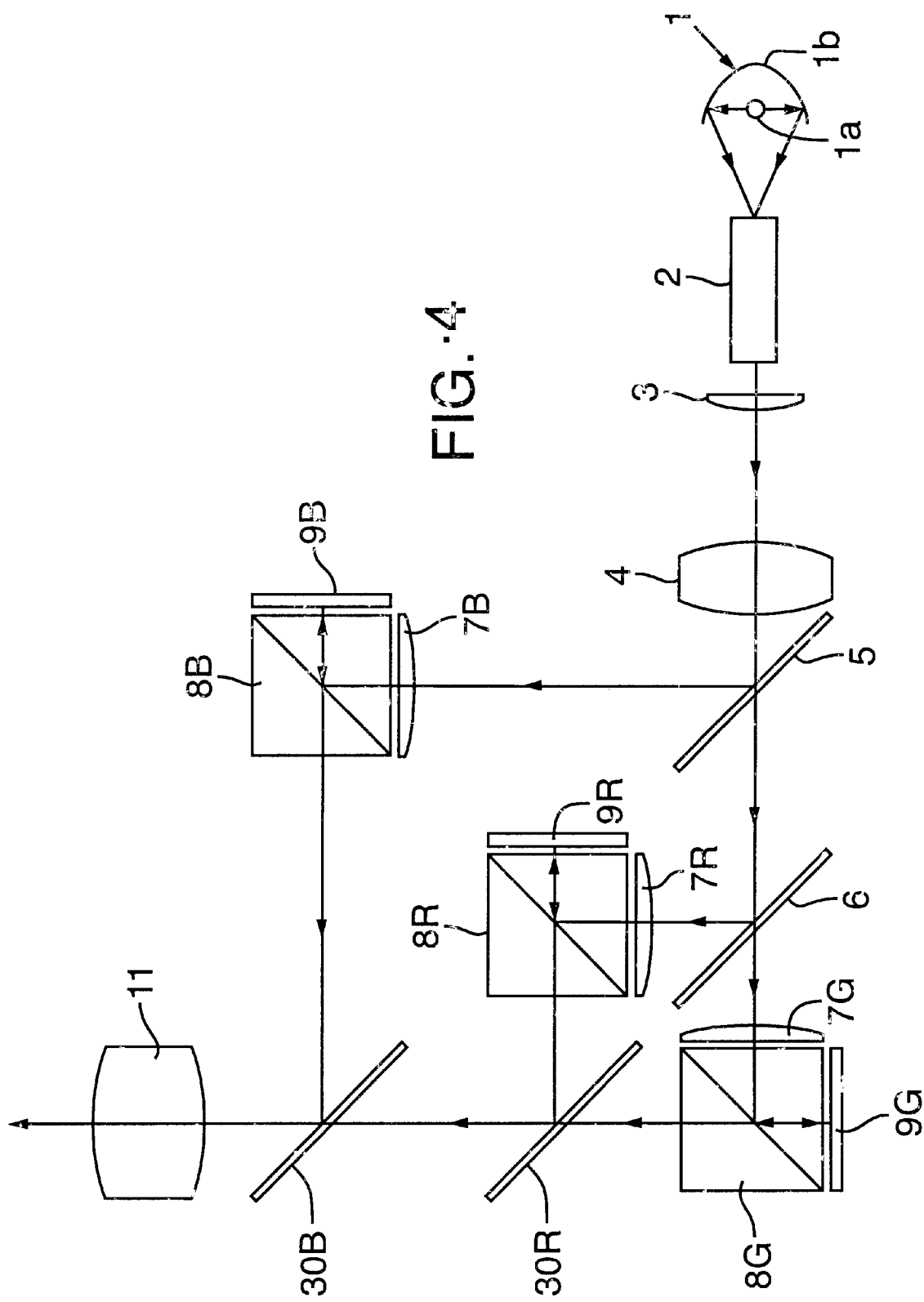
FIG. 4 is a schematic diagram of a projection display according to Example Embodiment 3.

FIG. 4 shows a schematic of a projection display according to Example Embodiment 3. Elements of the projection system of FIG. 4 that are similar to Example Embodiments 1–2 use the same reference designators; additional description of these elements is omitted.

The projection display of Example Embodiment 3 differs from the projection display of Example Embodiment 1 in that a B-component reflector 30B and an R-component reflector 30R form the color-combining system in Example Embodiment 3, instead of the dichroic prism 10 of FIG. 1. The B-component reflector 30B and the R-component reflector 30R are respectively arranged at locations corresponding to the locations of the B-component reflecting layer 10B and the R-component reflecting layer 10R of FIG. 1. Example Embodiment 3 therefore uses the parallel reflectors 30B, 30R as a color-combining system.

The projection system of Example Embodiment 3 has advantages similar to those of the projection display of Example Embodiments 1 and 2.

It will be apparent to those skilled in the art that other optical configurations are possible. In Example Embodiments 1–3, the same state of polarization is directed to each of the light valves 9R, 9G, 9B. The invention is not limited to such a configuration. For example, s-polarized R- and B-components can be reflected by the polarizing beamsplitters 8B, 8R to the light valves 9B, 9R, respectively; the P-polarized G-component can be transmitted by the polarizing beamsplitter 8G and directed toward the light valve 9G.

Example Embodiments 1–3 use a rod integrator 2 in the shape of a rectangular parallelopiped as an integrator. However, other integrators, such as a fly-eye lens can be used. In addition, a parabolic mirror or a spherical mirror can be substituted for the ellipsoidal mirror 1b.

EXAMPLE EMBODIMENT 4

Figure 5:
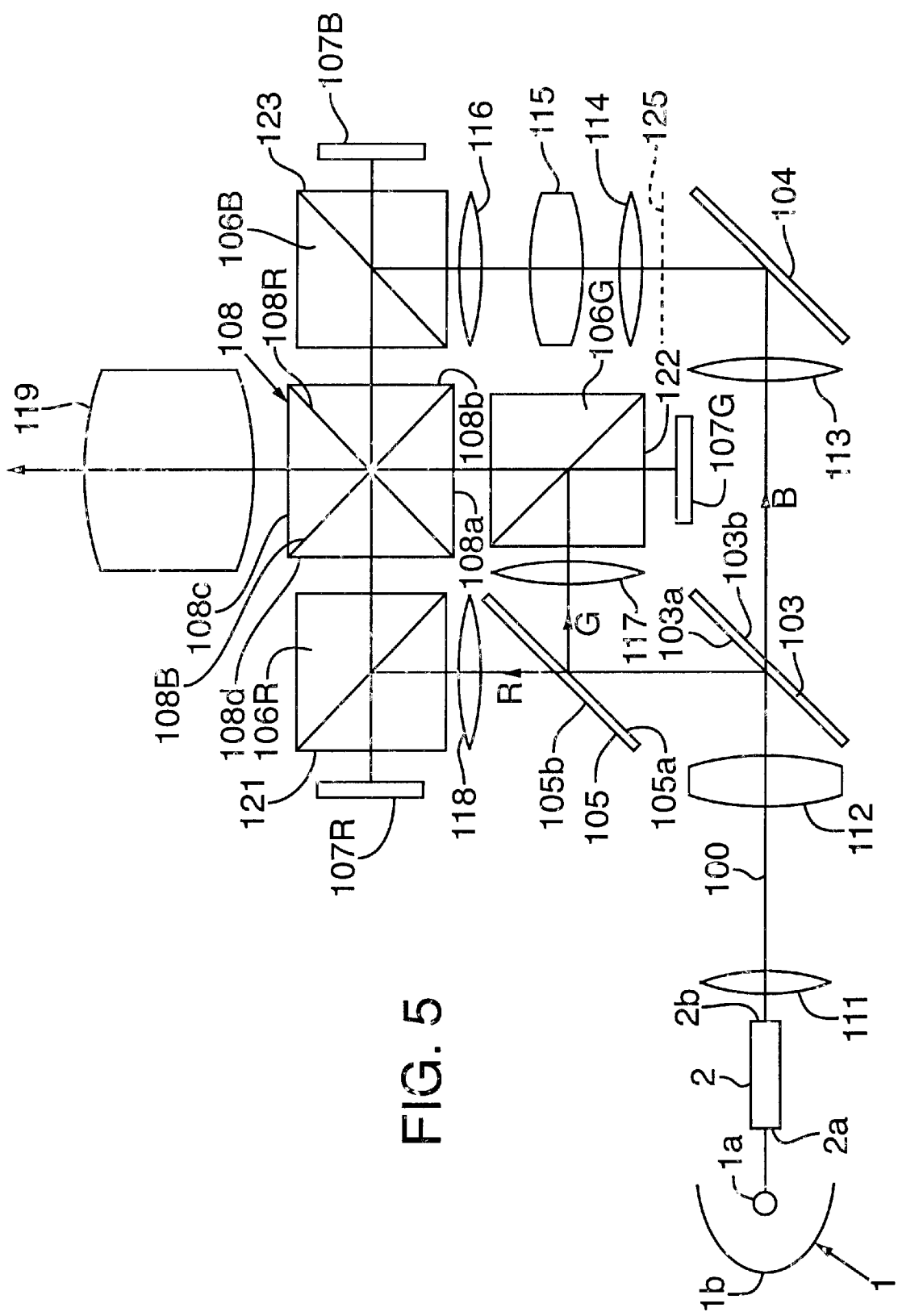
FIG. 5 is a schematic diagram of a projection display according to Example Embodiment 4.

With reference to FIG. 5, a projection display according to Example Embodiment 4 comprises an illumination system 1 having a light source 1a and an ellipsoidal reflector 1b. A light flux exits an exit face 2b of a rod integrator 2 and is directed by a field lens 111 and a relay lens 112 to a first dichroic mirror 103. The first dichroic mirror 103 is tilted at an angle of 450 with respect to an optical axis 100. The first dichroic mirror 103 transmits the B-component and reflects the R- and G-components of the incident light flux. The B-component is transmitted by the first dichroic mirror 103 to a field lens 113. A turning mirror 104 reflects the B-component to a field lens 114, a relay lens 115 having unit magnification, and a field lens 116. The B-component is then incident upon a B-component polarizing beamsplitter 106B.

The first dichroic mirror 103 reflects the R- and G-components of the incident light flux to a second dichroic mirror 105 that is parallel to the dichroic mirror 103 (i.e., a surface of the dichroic mirror 105 is at an angle of 45° with respect to the optical axis 100). The second dichroic mirror 105 reflects the G-component and transmits the R-component of the incident light flux. The second dichroic mirror 105 reflects the G-component to a field lens 117 and a G-component polarizing beamsplitter 106G. The second dichroic mirror 105 transmits the R-component to a field lens 118 and an R-component polarizing beamsplitter 106R. Thus, the light flux from the illumination system 1 is separated into color components by the parallel first and second dichroic mirrors 103, 105. Thus, the first and second dichroic mirrors 103, 105 form a color-separation system.

The R-, G-, and B-components are incident upon polarizing beamsplitters 106R, 106G, 106B, respectively, and are further split into p-polarized components and s-polarized components. The p-polarized components are transmitted by the polarizing beamsplitters 106R, 106G, 106B, and the s-polarized components are reflected. The p-polarized components of the color components are discarded, and the reflected s-polarized components are directed to reflective light valves 107R, 107G, 107B, respectively. The light valves 107R, 107G, 107B are placed near exit faces 121, 122, 123 of the polarizing beamsplitters 106R, 106G, 106B, respectively. Ray traces are shown in FIG. 6.

Figure 6:
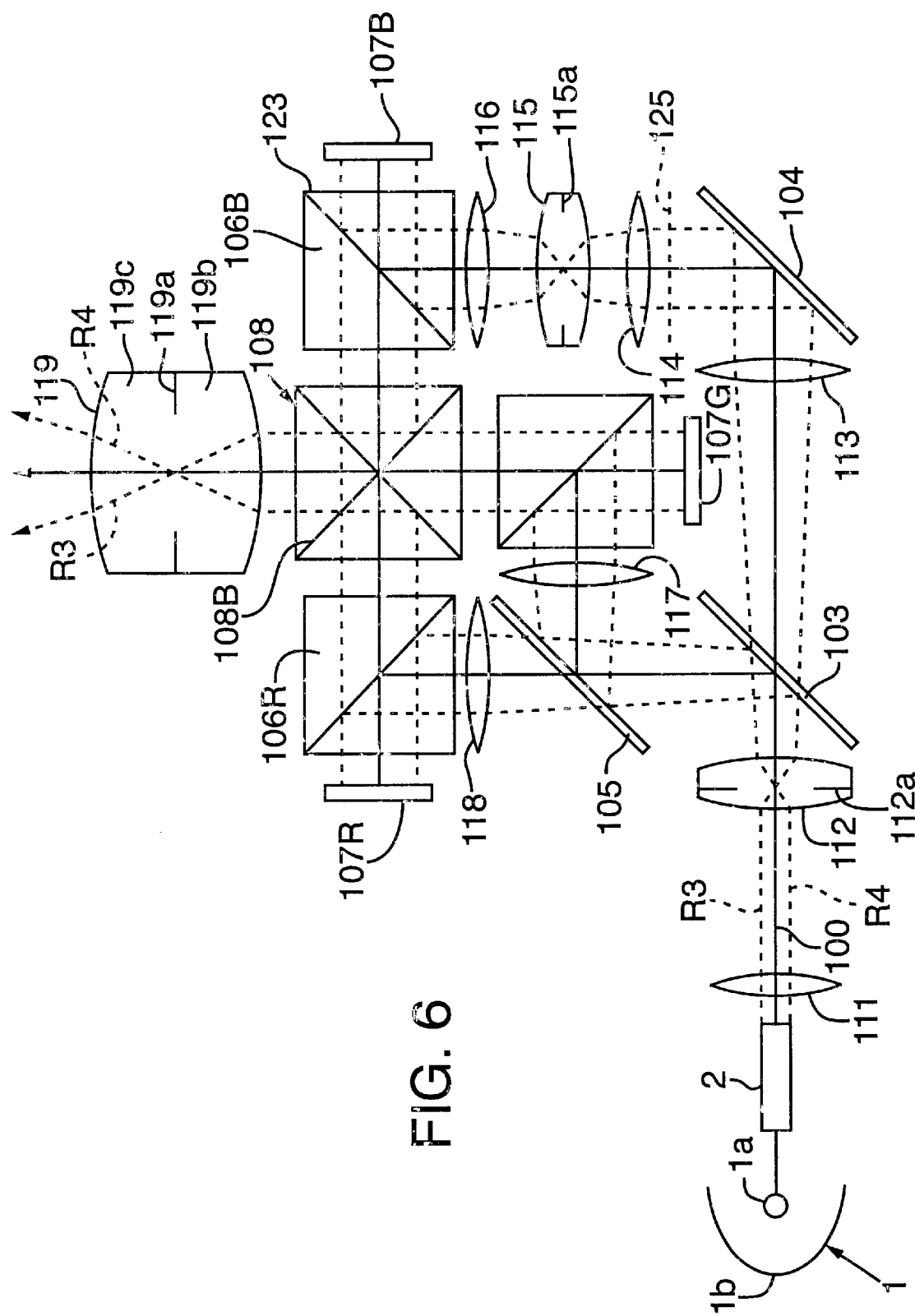
FIG. 6 is an optical diagram showing optical ray paths in the projection display of FIG. 5.

It will be apparent from FIGS. 5 and 6 that the optical path lengths of the R- and G-components from the illumination system 1 to corresponding light valves 107R, 107G are equal. In contrast, the optical path length of the B-component from the illumination system 1 to the light valve 107B is longer than the corresponding optical path length of the R- and G-components.

The s-polarized R-, G-, and B-components are modulated by the respective light valves 107R, 107G, 107B in accordance with image signals for each of the color components. The modulated R-, G-, and B-components exit the light valves 107R, 107G, 107B and return to the polarizing beamsplitters 106R, 106G, 106B, respectively.

The modulated R-, G-, and B-components are analyzed by the polarizing beamsplitters 106R, 106G, 106B, respectively; i.e., the p-polarized components of the modulated color components are transmitted to a crossed-dichroic prism 108 that recombines the modulated, analyzed color components. The s-polarized components of the modulated color components are discarded.

The crossed-dichroic prism 108 comprises four isosceles right-angle prisms. The right-angle prisms are cemented together and the right-angle corners are joined together such that an R-component reflecting layer 108R and a B-component reflecting layer 108B, that are deposited on sides of the prisms, intersect at right angles so as to form an "X".

The analyzed B-component from the polarizing beamsplitter 106B is reflected by the B-component reflecting layer 108B and exits the crossed-dichroic prism 108 and propagates towards a projection lens 119. Similarly, the R-component reflecting layer 108R reflects the analyzed R-component from the polarizing beamsplitter 106R to the projection lens 119. Similarly, the analyzed G-component from the polarizing beamsplitter 106G is transmitted by the B-component reflecting layer 108B and the R-component reflecting layer 108R to the projection lens 119.

The modulated, analyzed color components are thus recombined by the crossed-dichroic prism 108. The projection lens 119 projects a color image onto a screen, not shown in FIG. 5 (but located downstream of the projection lens 119).

Because the polarizing beamsplitters 106R, 106G, 106B each polarize and analyze only a single color component and not white light, the polarizing beamsplitters have excellent polarizing and analyzing properties, and provide excellent image contrast in the projected image. Furthermore, because the modulated color components exiting the light valves 107R, 107G, 107B are analyzed by the polarizing beamsplitters 106R, 106G, 106B, respectively, before being recombined by the crossed-dichroic prism 108, birefringence in the crossed-dichroic prism 108 does not degrade image contrast. Therefore, the prisms of the crossed-dichroic prism 108 need not be made of expensive, low birefringence materials.

It is preferable that anti-reflection coatings be applied on exit surfaces 103b, 105b of dichroic mirrors 103, 105, respectively. Anti-reflection coatings are also preferably applied to entrance surfaces 103a, 105a, respectively. In addition, anti-reflection coatings are preferably provided on surfaces 108a, 108b, 108c, 108d of the crossed-dichroic prism 108.

With reference to FIG. 6, the projection lens 119 comprises an illumination-side lens group 119b, an aperture stop 119a, and a image-side lens group 119c. The aperture stop 119a is placed at the back focus (i.e., the image-side focal point) of the lens group 119b. The projection lens 119 is illumination-side telecentric as can be readily demonstrated. Rays such as exemplary rays R3, R4 propagate parallel to the optical axis 100 from the crossed-dichroic beamsplitter 108 to the projection lens 119. The lens group 119b directs the rays R3, R4 through the center of the aperture stop 119a. Therefore, the rays R3, R4 are chief rays (a chief ray is conventionally defined as a ray passing through the center of an aperture stop) and the projection lens 119a is illumination-side telecentric.

FIG. 6 shows that rays R3, R4 also pass through an aperture stop 112a of the relay lens 112 and an aperture stop 115a of the relay lens 115. Accordingly, the light valves 107R, 107G, 107B are illuminated such that the rays R3, R4 are chief rays of the projection lens 119 and the lenses 112, 115. The light valves are illuminated so that chief rays of the projection lens 119 and the lenses 112, 115 strike the light valves 107R, 107G, 107B while the chief rays are propagating parallel to the optical axis 100. Therefore, image defects caused by varying angles of incidence are reduced.

The relay lens 112 images the G- and R-components of the light flux exiting the exit face 2b of the rod integrator 2 on the light valves 107G, 107R, respectively. Therefore, so-called critical illumination of the light valves 107G, 107R is achieved. In Example Embodiment 4, the relay lens 112 provides a magnification corresponding to the ratio of the areas of the exit face 2b and image-forming portions of the light valves 107G and 107R. Such a magnification avoids excess light-flux loss. The relay lens 112 forms a B-component image 125 of the exit face 2b at a location conjugate to the light valves 107G, 107R, between turning mirror 104 and the field lens 114. In addition, the relay lens 115 re-images the image 125 on the light valve 107B. Accordingly, critical illumination of light valve 107B by the B-component is achieved.

Because the relay lens 112 is used for all of the color components, the size of the image 125 is equal to the size of the image-forming portions of the light valves 107G, 107R. Accordingly, in Example Embodiment 4, because the light valves 107R, 107G, 107B are all the same size, a relay lens having unit magnification is used as the relay lens 115 since the image 125 is to be formed on light valve 107B. Moreover, with respect to the B-component, the image 125 is re-imaged onto the light valve 107B so that the field lens 111 and the relay lens 12, used for R- and G-component illumination, can also be used for B-component illumination. The optical path length from the exit face 2b of the rod integrator 2 to the B-component light valve 107B is longer than the optical path length from the exit face 2b to either the G-component light valve 107G or the R-component light valve 107R.

The light valves 107R, 107G, 107B are critically illuminated, i.e., the surface 2b is imaged onto the light valves 107R, 107G, 107B. In addition, chief rays through the aperture stops 112a, 119a propagate parallel to the axis 100. Thus, the illumination of the light valves 107R, 107G, 107B is telecentric critical illumination and angle-of-incidence variations in light-valve modulation are reduced. Because the PBSs 106R, 106G, 106B and the color-separation and color-combining systems reflect and transmit this telecentric critical illumination, angle-of-incidence variations causing reduced image contrast or color shading are reduced.

It will be readily apparent that a pair of dichroic mirrors can be used in place of the crossed-dichroic prism 108. The dichroic mirrors are preferably placed at the positions of the reflecting surfaces of the crossed-dichroic prism 108.

EXAMPLE EMBODIMENT 5

Example Embodiment 5 is similar to Example Embodiments 1–2 and, for convenience, elements of Example Embodiment 5 corresponding to elements of Example Embodiments 1–2 are denoted with the same reference designators and description of such elements is omitted or abbreviated.

Figure 7:
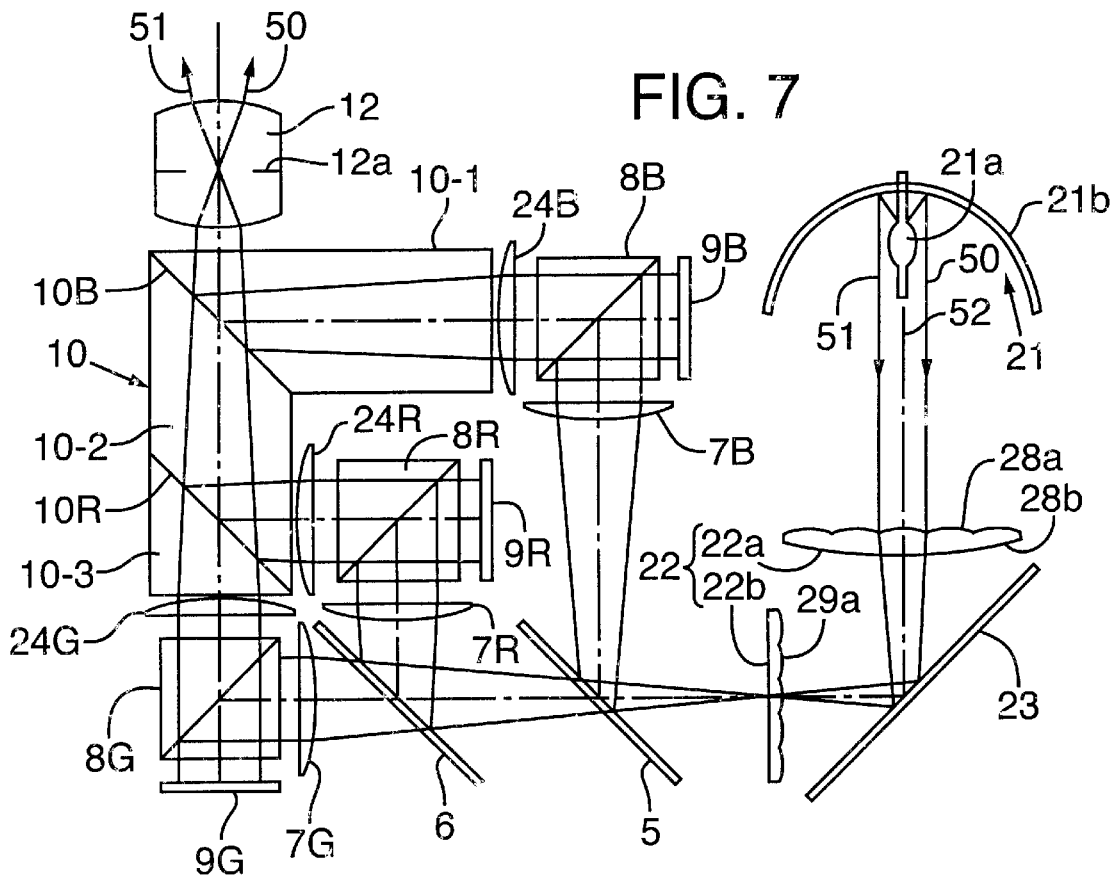
FIG. 7 is a schematic drawing showing a projection display and an optical layout according to Example Embodiment 5.

With reference to FIG. 7, a projection display according to Example Embodiment 5 comprises a light source 21 having a parabolic mirror 21b and a lamp 21a that emits a light flux with R-, G-, and B-components. The parabolic mirror 21b reflects the light flux emitted by the lamp 21a so that the light flux exits the parabolic mirror 21b as a substantially collimated light flux. The light flux is incident to a first lens plate 22a that is part of a fly-eye integrator 22. A side 28a of the first lens plate 22a that faces the lamp 21a is provided with an array of lenses of 5 rows by 6 columns; a second surface 28b of the first lens plate 22a is a spherical surface.

The light flux exiting the first lens plate 22a is reflected an angle of 90° by a turning mirror 23. The light flux then is incident upon a second lens plate 22b that is a part of the fly-eye integrator 22. A surface 29a of the second lens plate 22a faces the turning mirror 23 and is provided with an array of lenses, the lenses corresponding to the lenses on the first lens plate 22a.

The light flux exits the second lens plate 22b and is separated into R-, G-, and B-components by dichroic mirrors 5, 6 that form a color-separation optical system. The color-components are incident on respective field lenses 7R, 7G, 7B and polarizing beamsplitters 8R, 8G, and 8B. A polarized component of each of the color-components is reflected by the polarizing beamsplitters 8R, 8G, 8B to corresponding reflective light valves 9R, 9G, 9B.

The lenses of the array of lenses on the surface 28a of the first lens plate 22a are spherical surfaces that have a vertical to horizontal dimensional ratio corresponding to illuminated regions of light valves 9R, 9G, 9B. The second lens plate 22b is preferably placed a distance equal to the focal length of the lenses on the surface 22a from the first lens plate 22a. As a result, a plurality of images of the lamp 21a produced by the plurality of lenses on the surface 28a are formed on corresponding lenses on the second lens plate 22b.

A lens in the array of lenses on the surface 29a receives a light flux from the light source 21a; the lenses on the surface 29a form multiple images of this light flux on the light valves 9R, 9G, 9B. Multiple images of light fluxes on the lenses in the array on surface 29a provide more uniform illumination of the light valves 9R, 9G, and 9B. The light fluxes incident to the lenses of the array on the surface 29a form secondary light sources; these secondary light sources are imaged by the array on surface 29a on the light valves 9R, 9G, 9B. Therefore, the light valves 9R, 9G, 9B are critically illuminated.

FIG. 7 shows two exemplary light rays 50, 51 emitted by the lamp 21a. These rays are reflected by the parabolic reflector 21b and propagate parallel to and equidistant from an axis 52. The rays 50, 51 are incident upon the first lens plate 22a having a separation equal to a width of one of the plurality of lenses in the array of lenses the first lens plate 22a. The rays 50, 51 are focused on a corresponding lens on the second lens plate 22b. The rays 50, 51 exit the second lens plate 22b and propagate to the color-separation system comprising the dichroic mirrors 5, 6. After separation into color-components and transmission through the field lenses 7R, 7G, 7B, the rays 50, 51 propagate parallel to the axis 52 and are incident upon the polarizing beamsplitters 8R, 8G, and 8B.

The p-polarized components of the color components incident on the polarizing beamsplitters 8R, 8G, 8B are transmitted; the s-polarized components are reflected and are incident upon the light valves 9R, 9G, 9B. The light valves 9R, 9G, 9B modulate corresponding color-components and reflect the color 10 components back to the polarizing beamsplitters 8R, 8G, 8B, respectively. The polarizing beamsplitters 8R, 8G, 8B, analyze the modulated color components and transmit the color components to the dichroic prism 10 and the projection lens 112.

The exemplary rays 50, 51 exit the polarizing beamsplitters 8R, 8G, 8B, and proceed along, but not parallel to, the optical axis 52. Respective field lenses 24R, 24G, 24B receive the parallel, color-separated rays 50, 51 from the polarizing beamsplitters and converge the rays 50, 51. The field lenses 24R, 24G, 24B, are incident upon the L-shaped dichroic prism 10, and trichromatic combination is accomplished. After being re-combined, the rays 50, 51 are incident upon a projection lens 12. The projection lens 12 forms an image on a screen, not shown in FIG. 7 but located downstream of the projection lens.

The rays 50, 51 intersect at the center of an aperture stop 12a of the projection lens 12. Therefore, the rays 51, 52 are chief rays. The projection lens 12 is not illumination-side telecentric because the rays 50, 51 pass through the center of the aperture stop 12a but do not reach the projection lens 12 propagating parallel to the axis 52. In the embodiment of FIG. 7, the color-combining system receives chief rays that do not propagate parallel to the axis; accordingly, angle of incidence variations in image quality due to the dichroic prism 10 are possible. Nevertheless, such a system is advantageous in that the dichroic prism 10 can be more compact.

Elsewhere, the chief rays are parallel to the optical axis, i.e., telecentricity is maintained. Therefore, image degradation due to angle of incidence variations in the color-separation system, the polarizing beamsplitters 8R, 8G, 8B, and the light valves 9R, 9G, 9B are reduced as in the Example Embodiments discussed above.

EXAMPLE EMBODIMENT 6

Figure 8:
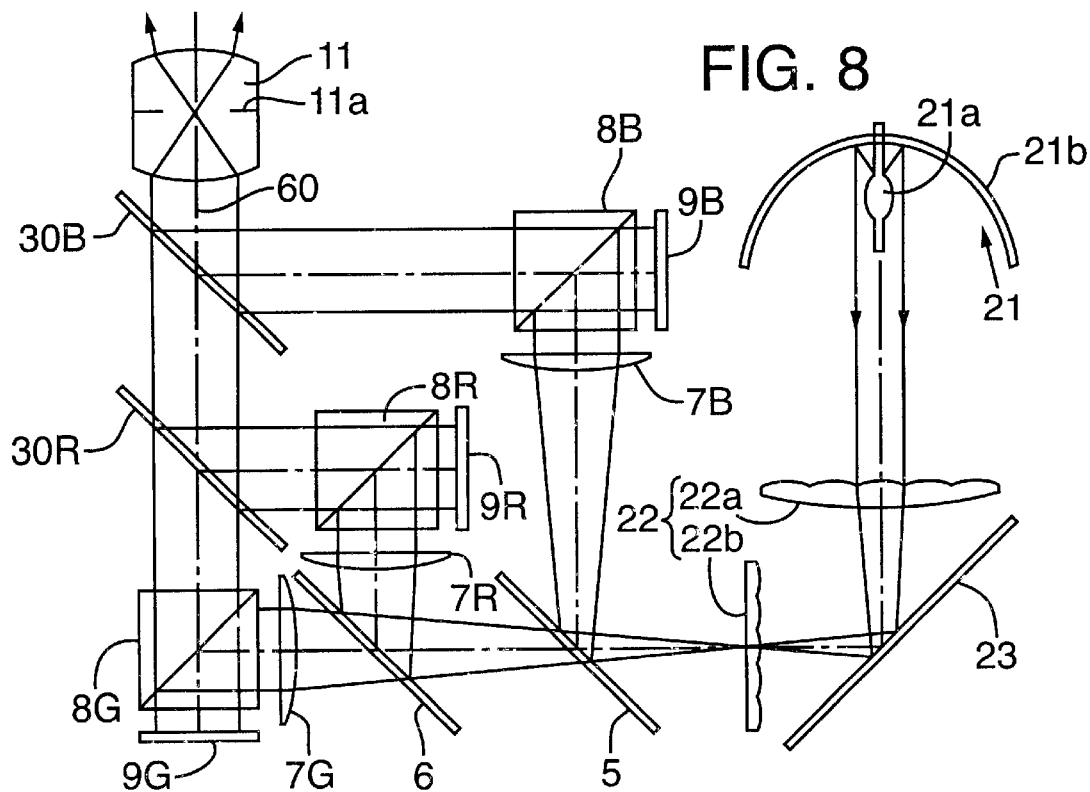
FIG. 8 is a schematic drawing showing a projection display according to Example Embodiment 6.

FIG. 8 shows a projection display according to Example Embodiment 6, similar to that of Example Embodiment 5. Example Embodiment 6 differs from Example Embodiment 5 in that dichroic mirrors 30B, 30R are placed at locations corresponding to dichroic layers 10B, 10R; the dichroic mirrors 30B, 30R therefore replace the dichroic mirror 10. In addition, the field lenses 24R, 24G, 24B of Example Embodiment 5 are omitted and chief rays propagate parallel to an optical axis 60.

EXAMPLE EMBODIMENT 7

Figure 9:
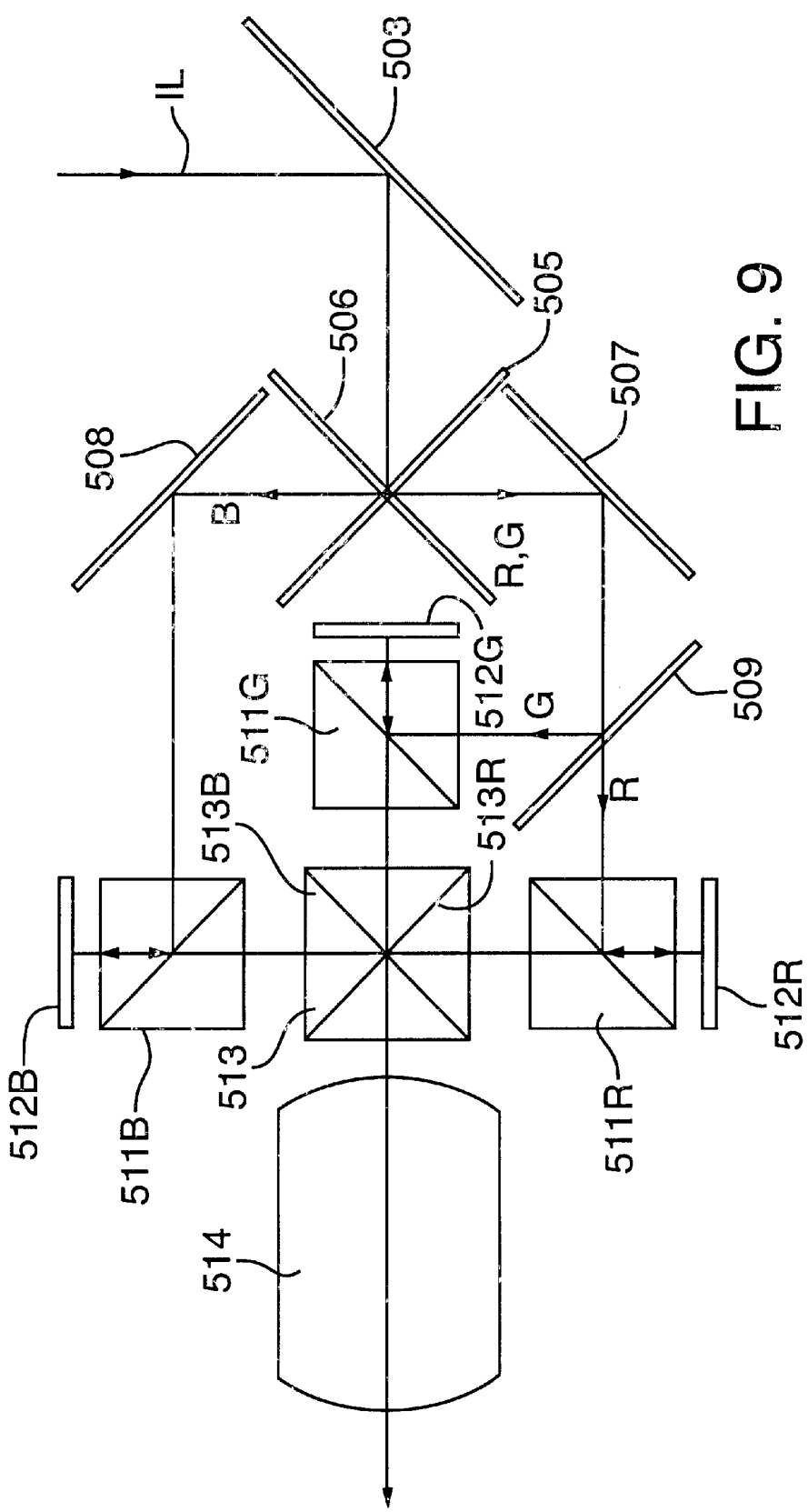
FIG. 9 is a schematic drawing showing a projection display according to Example Embodiment 7.

With reference to FIG. 9, a projection display according to Example Embodiment 7 comprises a turning mirror 503 that directs a uniform, collimated incident light flux IL to crossed-dichroic mirrors 505, 506. The dichroic mirror 506 reflects the R- and G-components of the light flux IL to a turning mirror 507; the dichroic mirror 505 reflects the B-component of the light flux IL to a turning mirror 508.

The R- and G-components are separated by a dichroic mirror 509 that directs the R-component to a polarizing beamsplitter 511R; the G-component is reflected to a polarizing beamsplitter 511G. Either the s- or p-polarized component of the R- and G-components are modulated and reflected by respective light valves 512R, 512G to a crossed-dichroic prism 513. A reflecting surface 513R reflects the R-component to a projection lens 514; the G-component is transmitted by the crossed-dichroic prism 513 to the projection lens 514.

The B-component is reflected by the turning mirror 508 to a polarizing beamsplitter 511B and a light valve 512B. After modulation and reflection by the light valve 512B, the B-component is reflected by the reflecting surface 513B.

EXAMPLE EMBODIMENT 8

Figure 10:
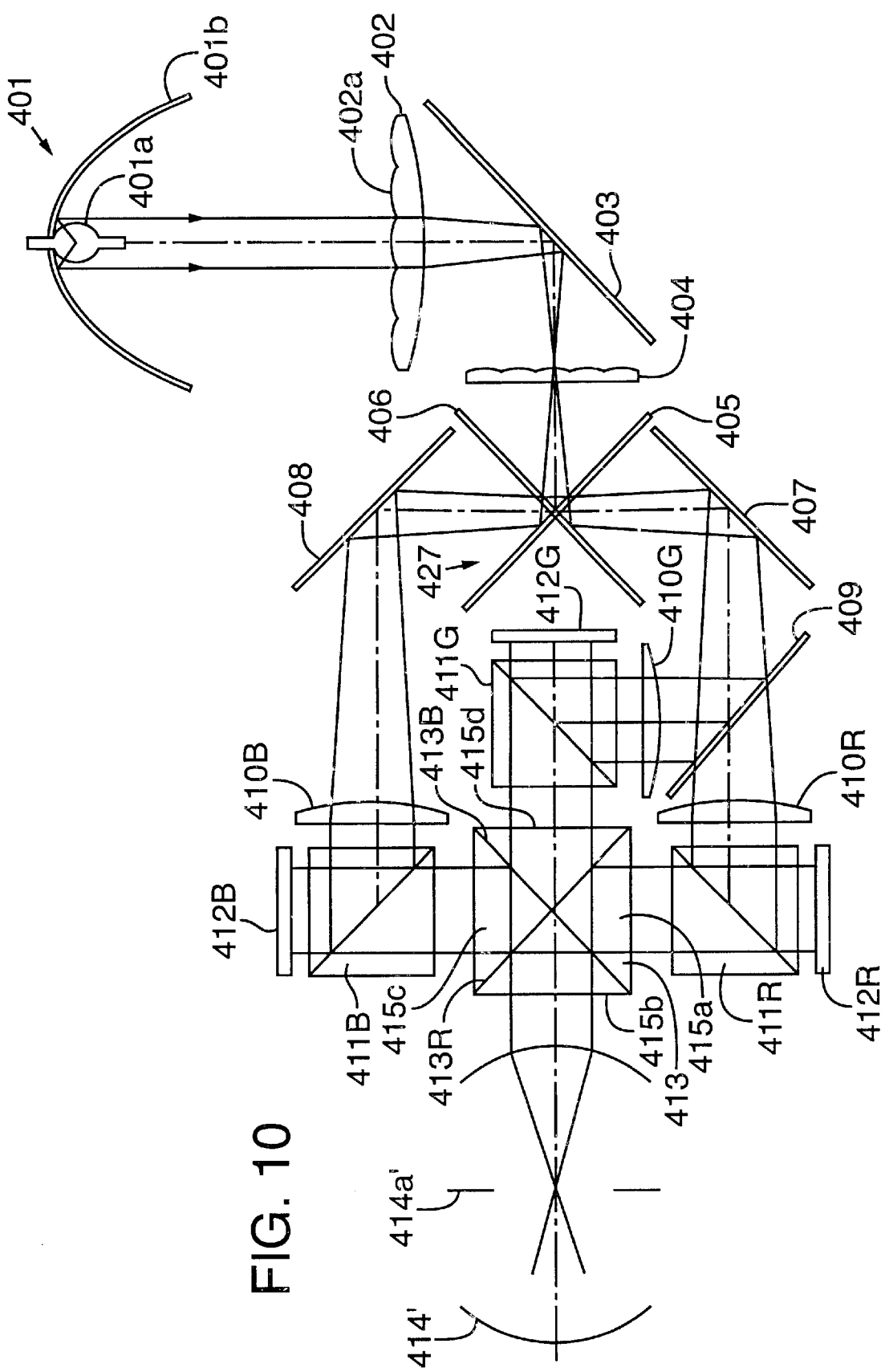
FIG. 10 is a schematic drawing showing a projection display according to Example Embodiment 8.

With reference to FIG. 10, a projection display according to Example Embodiment 8 comprises an illumination system 401 comprising a light source 401a and a parabolic reflector 401b. The light source 401a emits a light flux containing R-, G-, and B-components. The light flux is made uniform by an integrator consisting of a first lens plate 402 and a second lens plate 404.

A turning mirror 403 reflects the light flux to a crossed-dichroic mirror 427 comprising a B-component reflecting dichroic mirror 405 and an R- and G-component reflecting dichroic mirror 406. The crossed-dichroic mirror 427 reflects the B-component toward a turning mirror 408; the turning mirror 408 then reflects the B-component to a field lens 410B and a B-component polarizing beamsplitter 411B.

The crossed-dichroic mirror 427 reflects the R- and G-components to a turning mirror 407. The turning mirror 407 directs the R- and G-components to a G-component reflecting dichroic mirror 409. The dichroic mirror 409 is arranged parallel to the dichroic mirror 405. The dichroic mirror 409 transmits the R-component to a field lens 410R and a polarizing beamsplitter 411R. The G-component is reflected to a field lens 410G and a polarizing beamsplitter 411G. Thus, the light flux from the illumination system 401 is color-separated into R-, G-, and B-components by a color-separation system comprising the dichroic mirror 409 and the crossed-dichroic mirror 427.

The color components are incident to corresponding field lenses 410R, 410G, 410B and corresponding polarizing beamsplitters 411R, 411G, 411B. The polarizing beamsplitters 411R, 411G, 411B reflect an s-polarized component of the respective color-component to corresponding reflective light valves 412R, 412G, 412B. The p-polarized components are transmitted by the polarizing beamsplitters 411R, 411G, 411B and discarded. The optical path lengths for each of the respective color components, measured from the light source 401a to the corresponding light valve, are equal.

The R-, G-, and B-components exit the respective reflective light valves 412R, 412G, 412B, modulated in accordance with image signals for the respective color components. The modulated color components are incident upon the respective polarizing beamsplitters 411R, 411G, 411B and portions of the modulated color components are transmitted by the polarizing beamsplitters 411R, 411G, 411B to a dichroic prism 413 that recombines the color components. The dichroic prism 413 is formed by cementing together four isosceles right-angle prisms 415a, 415b, 415c, 415d.

An R-component reflecting dichroic layer 413R and a B-component reflecting dichroic layer 413B are formed on surfaces of the prisms 415a, 415b, 415c, 415d, forming a crossed-dichroic prism 413. The dichroic prism 413 reflects the R- and B-components and transmits the G-component to a projection lens 414.

The projection display of FIG. 10 reduces color shading and improves image contrast. In addition, because the optical path lengths from the light source 401a to the light valves 412R, 412G, 412B are equal, no additional optical elements are required to equalize the optical path lengths, permitting a reduction in the size of the projection system.

Figure 11:
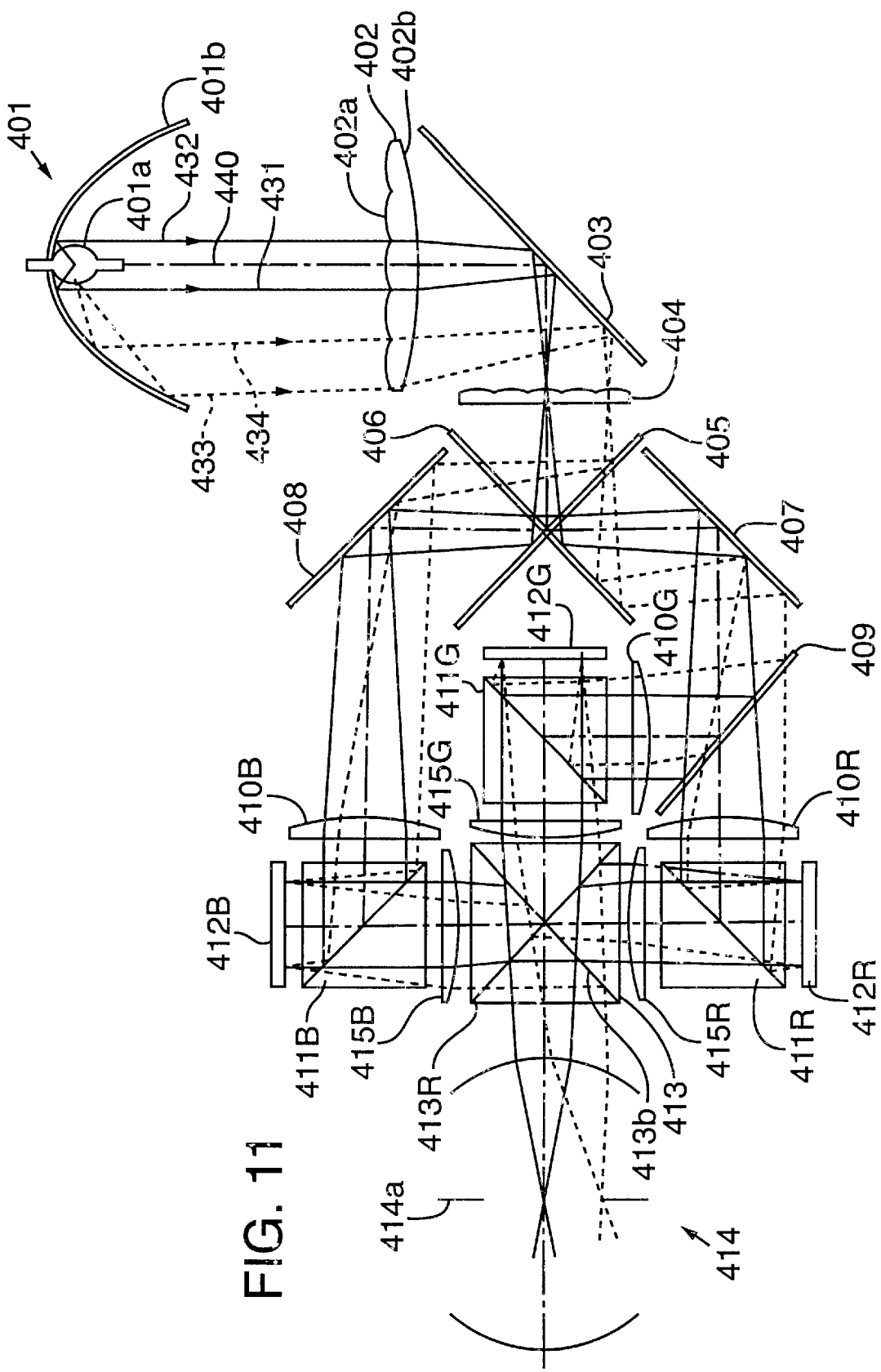
FIG. 11 is an optical diagram showing optical ray paths in the projection display of FIG. 10.

FIG. 11 shows paths of light rays 431, 432, 433, 434 that are emitted by the light source 401a of the projection display of Example Embodiment 8. The rays 431, 432, 433, 434 are reflected by the parabolic reflector 410b and propagate parallel to an axis 440 to the first lens plate 402. As will be readily understood, the light flux reflected by the parabolic mirror is substantially collimated.

The first lens plate 402 has an array of lenses formed on a side 402a that faces the illumination system 401. The array of lenses is preferably an array of 5 rows by 6 columns of lenses. A side 402b of the first lens plate 402 is a spherical surface. The lenses of the array of lenses have a prescribed radius of curvature and a shape corresponding and proportional to the shape of the light valves 412R, 412G, 412B. The second lens plate 404 is placed a distance from the first lens plate 402 equal to the focal length of the lenses of the array of lenses on the first lens plate 402. In this way, the images of the light source 401 a produced by the array of lenses on the first lens plate 402 appear on corresponding lenses in an array of lenses on the second lens plate 404. Moreover, the array of lenses on the second lens plate 404 has rows and columns matching those of the array of lenses on the first lens plate 402. The lenses on the second lens plate 404 form images on the light valves of the illumination on the lenses of the array of lenses on the first lens plate 402, the individual lenses on the second lens plate 404 superimposing these images on the light valves. That is, considering the lenses on the side 402a to be secondary light sources, the light valves 412R, 412G, 412B are critically illuminated by corresponding lenses of the array of lenses on the second lens plate. The superposition of the illumination from the lenses in the arrays of lens provides improved uniformity of illumination.

Exemplary rays 431, 432 propagate parallel to and equidistant from an optical axis 440. The rays 431, 432 are spaced from the axis 440 a lateral distance corresponding to the size of a lens on the first lens plate 402. The rays 431, 432 are focused by a lens of the first lens plate 402 so as to intersect on the second lens plate 404. The rays 431, 432 are color-separated into an R-component and a G-component. The R component is made parallel to the optical axis by the field lens 410R and is incident upon the PBS 411R. The field lens 410G makes the G-component reflected by dichroic mirror 409 propagate parallel to the optical axis; the G-component is then incident upon the PBS 411G. The B-component reflected by dichroic mirror 405 is reflected by the turning mirror 408 and is directed by the field lens 410B to the PBS 411B.

As described previously with respect to other Example Embodiments, the various color components are split into s- and p-polarizations and directed to respective light valves 412R, 412G, 412B. After modulation, the color components return to the respective PBSs 411R, 411G, 411B. The field lenses 415R, 415G, and 415B cause the respective color components to converge on the optical axis 440; the converging color components are combined by the crossed dichroic prism 413. The rays 431, 432 and 433, 434 intersect at the aperture stop 414a of the projection lens 414. The rays 431, 432 intersect at the center of the aperture stop 414a and therefore are chief rays, and the aperture stop 414a is a telecentric stop. In addition, the illumination system provides telecentric critical illumination of the light valves 412R, 412G, 412B when the multiple images of the light source 401 a are regarded as illumination sources.

The rays 431, 432 are chief rays; other rays such as rays 433, 434 propagate differently. For example, rays 433, 434 reflected by the parabolic mirror are incident to an off-axis lens on the surface 402a. The rays 433, 434 propagate parallel to the axis 440 until refracted by the first lens plate 402. A lens of the array of lens on the second lens plate 404 images this off-axis lens onto the light valves 411R, 411G, 411B.

Having illustrated and demonstrated the principles of the invention in example embodiments, it should be apparent to those skilled in the art that these embodiments can be modified in arrangement and detail without departing from such principles. For example, additional reflective elements can be provided to fold the optical paths of the example embodiments. In addition, the three light valves can be arranged to use various combinations of s- and p-polarization; all three light valves need not use the same polarization. We claim as the invention all that comes within the scope of the following claims.

What is claimed is:

1. A projection apparatus, comprising:
   a light source that emits a light flux that includes first, second, and third color components;
   a color-separation optical system that separates the first, second, and third color components;
   first, second, and third polarizing beamsplitters situated to receive and polarize the first, second, and third color components, respectively;
   first, second, and third reflective light valves that receive the first, second, and third color components from the first, second, and third polarizing beamsplitters, respectively, and produce respective modulated color components that are directed to the first, second, and third polarizing beamsplitters, respectively, for analysis;
   a color-combining optical system that combines the analyzed color components received from the polarizing beamsplitters; and
   a projection lens for projecting the combined color components, the projection lens comprising an aperture stop that defines chief rays, the polarizing beadsplitters being situated where the chief rays are parallel to respective optical axes, and the color-separation optical system being situated where the chief rays are divergent to the respective optical axes.

2. The projection apparatus of claim 1, wherein the first, second, and third reflective light valves are situated where the chief rays are parallel to respective optical axes.

3. The projection apparatus of claim 1, further comprising a rod integrator situated to receive the light flux emitted by the light source and to direct the light flux to the color-separation optical system, the rod integrator including an exit surface that defines a planar light source.

4. The projection apparatus of claim 3, further comprising a field lens and a relay lens situated between the rod integrator and the color-separation optical system.

5. The projection apparatus of claim 1, further comprising a fly-eye lens integrator that receives the light flux from the light source.

6. The projection apparatus of claim 1, further comprising first, second, and third field lenses situated between the color-separation optical system and respective polarizing beamsplitters.

7. The projection apparatus of claim 6, further comprising a relay lens situated to receive a selected color component and direct the selected color component to the respective field lens.

8. The projection apparatus of claim 1, wherein the color-combining optical system comprises a crossed-dichroic mirror or a crossed-dichroic prism.

9. The projection apparatus of claim 1, wherein the projection lens is telecentric, and the color-combining optical system, the first, second, and third polarizing beam splitters, and the first, second, and third light valves are situated where the chief rays are parallel to the respective optical axes.

10. A projection apparatus, comprising:
    a light source that emits a light flux that includes first, second, and third color components;
    a color-separation optical system that separates the first, second, and third color components;
    first, second, and third polarizing beamsplitters situated and configured to receive and polarize the first, second, and third color components, respectively;
    first, second, and third reflective light valves that receive the first, second, and third color components, respectively, and produce modulated color components that are directed to the first, second, and third polarizing beamsplitters, respectively, for analysis;
    a color-combining optical system situated and configured to combine the analyzed color components received from the polarizing beamsplitters; and
    a projection lens that projects the combined color components and comprises an aperture stop that defines chief rays, the polarizing beamsplitters being situated where the chief rays are parallel to the respective optical axes, and the color-separation optical system is situated where the chief rays are divergent to the respective optical axes.

11. The projection apparatus of claim 10, wherein the first, second, and third reflective light valves are situated where the chief rays are parallel to the respective optical axes.

12. The projection apparatus of claim 10, further comprising a rod integrator that receives the light flux from the light source, the rod integrator including an exit surface situated to serve as a planar light source, wherein a light flux emitted from the exit surface is incident to the color separation optical system.

13. The projection apparatus of claim 10, further comprising a fly-eye lens integrator situated and configured to receive the light flux from the light source and direct the light flux to the color-separation optical system.

14. The projection apparatus of claim 10, further comprising first, second, and third field lenses situated between the first, second, and third polarizing beamsplitters, respectively, and the color-separation optical system.

15. The projection apparatus of claim 10, wherein the color-separation optical system and the color-combining optical system are situated on a common plane.

16. The projection apparatus of claim 12, further comprising a field lens and a relay lens situated between the rod integrator and the color-separating optical system.

17. The projection apparatus of claim 14, further comprising a relay lens situated to receive a selected color component and direct the selected color component to the respective field lens.

18. The projection apparatus of claim 10, wherein the color-combining optical system comprises a crossed-dichroic mirror or a crossed-dichroic prism.

19. The projection apparatus of claim 10, wherein the projection lens is telecentric, and the color-combining optical system, the first, second, and third polarizing beam splitters, and the first, second, and third light valves are situated where the chief rays are parallel to the respective optical axes.

20. The projection apparatus of claim 19, wherein the color-separating optical system is situated where the chief rays are divergent to the respective optical axes.

21. A projection apparatus, comprising:
(a) a first optical system arranged so as to correspond to a red-light component, the first optical system comprising (i) a respective color-separating optical system for selecting a red-light component emitted from a light source, (ii) a respective polarizing-and-separating optical system situated to receive the red-light component from the respective color-separating optical system and comprising a respective polarizing beam splitter for emitting a polarized-light component of the red-light component incident thereon, (iii) a first reflection-type light valve situated and configured for modulating the polarized-light component emitted from the respective polarizing-and-separating optical system, and (iv) a respective analyzing optical system comprising the respective polarizing beam splitter, the respective analyzing optical system being situated and configured for analyzing a light component emitted from the first light valve;
(b) a second optical system arranged so as to correspond to a green-light component, the second optical comprising (i) a respective color-separating optical system for selecting a green-light component emitted from the light source, (ii) a respective polarizing-and-separating optical system situated to receive the green-light component from the respective color-separating optical system and comprising a respective polarizing beam splitter for emitting a polarized light component of the green-light component incident thereon, (iii) a second reflection-type light valve situated and configured for modulating the polarized-light component emitted from the respective polarizing-and-separating optical system, and (iv) a respective analyzing optical system comprising the respective polarizing beam splitter, the analyzing optical system being situated and configured for analyzing a light component emitted from the second light valve;
(c) a third optical system arranged so as to correspond to a blue-light component, the third optical comprising (i) a respective color-separating optical system for selecting a blue-light component emitted from the light source, (ii) a polarizing-and-separating optical system situated to receive the blue-light component from the respective color-separating optical system and comprising a respective polarizing beam splitter for emitting a polarized light component of the blue-light component incident thereon, (iii) a third reflection-type light valve situated and configured for modulating the polarized-light component emitted from the respective polarizing-and-separating optical system, and (iv) a respective analyzing optical system comprising the respective polarizing beam splitter, the respective analyzing optical system being situated and configured for analyzing a light component emitted from the third light valve; and
(d) a projection-optical system situated and configured for projecting the light analyzed by the analyzing optical systems, the projection-optical system comprising an aperture stop that defines chief rays, wherein the polarizing beam splitters are situated at respective locations where the respective chief rays are parallel to respective optical axes, and the respective color-separating optical systems are situated at respective locations where the chief rays are divergent to the respective optical axes.

22. The projection apparatus of claim 21, wherein the first, second, and third light valves are situated at respective locations where the chief rays are parallel to respective optical axes.

23. The projection apparatus of claim 21, wherein the first, second, and third optical systems further comprise a fly-eye lens integrator situated between the light source and the respective color-separating optical systems.

24. The projection apparatus of claim 23, wherein the first, second, and third optical systems comprise respective field lenses situated adjacent incident planes of the respective polarizing beam splitters of the respective polarizing-and-separating optical systems.

25. The projection apparatus of claim 21, wherein the first, second, and third optical systems each comprise a rod integrator situated between the light source and the respective color-separating optical systems.

26. The projection apparatus of claim 25, wherein the first, second, and third optical systems each comprise a respective field lens and a respective relay lens situated between the rod integrator and the respective color-separating optical systems.

27. The projection apparatus of claim 26, wherein the first, second, and third optical systems each comprise a respective field lens adjacent an incidence plane of the respective polarizing beam splitter.

* * * * *

UNITED STATES PATENT AND TRADEMARK OFFICE
CERTIFICATE OF CORRECTION

PATENT NO.     : 6,429,906 B1
DATED          : August 6, 2002
INVENTOR(S)    : Sekine et al.

It is certified that error appears in the above-identified patent and that said Letters Patent is hereby corrected as shown below:

<u>Title page,</u>
Item [57], ABSTRACT,
Line 6, "flux that made" should be -- flux made --.

<u>Column 4,</u>
Line 27, "is sectional" should be -- is a sectional --.
Line 49, "a (B) blue" should be -- a blue (B) --.

<u>Column 5,</u>
Line 49, "302 assume" should be -- 203 to assume --.

<u>Column 8,</u>
Line 11, "same those" should be -- same as those --.

<u>Column 9,</u>
Line 5, "of 450" should be -- of 45° --.

<u>Column 12,</u>
Line 49, "color 10 components" should be -- color-components --.

<u>Column 14,</u>
Line 61, "401 a produced" should be -- 401a produced --.

<u>Column 15,</u>
Line 8, "arrays of lens" should be -- array of lenses --.
Line 16, "R component" should be -- R-component --.
Line 39, "401 a" should be -- 401a --.
Line 44, "a lens of the array of lens" should be -- A lens of the array of lenses --.

UNITED STATES PATENT AND TRADEMARK OFFICE
CERTIFICATE OF CORRECTION

PATENT NO.    : 6,429,906 B1
DATED         : August 6, 2002
INVENTOR(S)   : Sekine et al.

It is certified that error appears in the above-identified patent and that said Letters Patent is hereby corrected as shown below:

<u>Column 17,</u>
Line 63, "optical comprising" should be -- optical system comprising --.

<u>Column 18,</u>
Line 14, "optical comprising" should be -- optical system comprising --.

Signed and Sealed this

Ninth Day of December, 2003

JAMES E. ROGAN
*Director of the United States Patent and Trademark Office*